United States Patent
Myers

(10) Patent No.: US 6,603,819 B1
(45) Date of Patent: Aug. 5, 2003

(54) RADIO SYMBOL SYNCHRONIZATION AND DOPPLER ESTIMATION TECHNIQUES

(75) Inventor: Michael H. Myers, Poway, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/512,938

(22) Filed: Feb. 25, 2000

(51) Int. Cl.[7] .............................................. H04L 27/22
(52) U.S. Cl. ...................... 375/316; 375/340; 375/285; 455/504; 455/63
(58) Field of Search ........................ 375/130, 136–137, 375/140, 142, 144–145, 148–150, 260, 279, 280, 283, 284, 285, 324, 325, 326, 330–332, 340, 342, 343, 346, 350, 362, 364, 371, 375, 376; 455/10, 501, 504–506, 67.1, 67.3, 150.1, 134, 135, 139, 205, 214, 222, 208, 226.1–226.3, 260, 277.2, 296, 334, 337; 342/357.01, 357.05, 357.06, 357.12, 402, 405, 418, 419; 370/320, 335, 342, 441, 465, 482, 483, 484, 503, 509, 512, 515, 516

(56) References Cited

U.S. PATENT DOCUMENTS

| | | | | |
|---|---|---|---|---|
| 5,432,819 A | * | 7/1995 | Mui ............................ 375/329 |
| 5,648,940 A | * | 7/1997 | McCool ....................... 367/90 |
| 5,696,797 A | * | 12/1997 | Bucher et al. ................ 375/344 |
| 6,005,903 A | * | 12/1999 | Mendelovicz ................ 375/367 |
| 6,028,883 A | * | 2/2000 | Tiemann et al. .............. 375/150 |
| 6,134,262 A | * | 10/2000 | Kitade et al. ................. 375/142 |
| 6,151,353 A | * | 11/2000 | Harrison et al. .............. 375/136 |
| 6,208,291 B1 | * | 3/2001 | Krasner .................. 342/357.12 |
| 6,246,732 B1 | * | 6/2001 | Kobayashi et al. ........... 375/346 |
| 6,331,835 B1 | * | 12/2001 | Gustafson et al. ....... 342/357.06 |
| 6,473,453 B1 | * | 10/2002 | Wilkinson .................... 375/143 |
| 6,473,594 B1 | * | 10/2002 | Piirainen ....................... 455/63 |

* cited by examiner

Primary Examiner—Tesfaldet Bocure
Assistant Examiner—Khanh Cong Tran
(74) Attorney, Agent, or Firm—McAndrews, Held & Malloy, Ltd.

(57) ABSTRACT

A radio receiver (10) processes a carrier signal having a Doppler shifted frequency and carrying a coded signal having variable phase and amplitude. The coded signal is divided into a preamble portion and a message portion. A memory (23) stores samples of the coded signal representing at least some of the predetermined symbols of the preamble. A logic unit (16) divides the stored samples into a plurality of sample groups and identifies one sample group having the minimum variation of envelope amplitude. That sample group is used to provide additional samples by which the Doppler shift of the carrier frequency is estimated (70). The coded signal is delayed by a delay operation (100) and has its Doppler shift reduced. The Doppler reduced coded signal is processed by a filter operation (120) and a demodulator (130).

14 Claims, 3 Drawing Sheets

RADIO SYMBOL SYNCHRONIZATION AND DOPPLER ESTIMATION TECHNIQUES

BACKGROUND OF THE INVENTION

A new generation of very high frequency (VHF) radios must include a mode of operation which has D8PSK (differential 8 phase shift keying) modulation, in accordance with International Commercial Aviation Organization (ICAO) Mode 2 waveform specification. The received radio signal may be corrupted by carrier frequency offset (Doppler) of up to + or −1800 Hz due to relative path motion plus relative transmit-receive frequency uncertainty.

A procedure is required that will robustly detect an incoming message, estimate the Doppler present and set the symbol timings so that the message can be demodulated accurately. This invention addresses these problems and provides a solution.

BRIEF SUMMARY OF THE INVENTION

The preferred embodiment is useful in a radio receiver adapted to receive a carrier signal having a Doppler shifted frequency. The carrier signal carries a coded signal having variable amplitude and phase which represents symbols coded by phase. The symbols are divided into a preamble portion having a predetermined code and a message portion. In such an environment, the preferred embodiment processes the coded signal by storing samples of the coded signal representing at least some of the predetermined symbols of the preamble. The stored samples have variable amplitudes and are divided into a plurality of sample groups. One sample group of the various sample groups is identified as having a predetermined amplitude relationship with respect to other of the sample groups. The samples of the coded signal are selected in response to the identification of the one sample group. The Doppler frequency of the selected samples is estimated, and the message portion of the coded signal is delayed while the identifying, selecting and estimating proceeds. The Doppler frequency of the coded signal is reduced in response to the estimated Doppler frequency in order to generate a Doppler reduced coded signal. The Doppler reduced coded signal is filtered in a filter matched only to the transmitted message, but including carrier offset, and the message portion is demodulated in response to the Doppler reduced coded signal.

The storing of the samples preferably is carried out by digital memory and the remaining portions of the above-described technique are preferably carried out by a digital processor.

By using the foregoing technique, an incoming message may be detected in a noisy background and any Doppler frequency present may be efficiently estimated. The technique is robust in time varying channels and is very efficient and conservative of processor time.

DETAILED DESCRIPTION OF THE INVENTION

Figure 1:
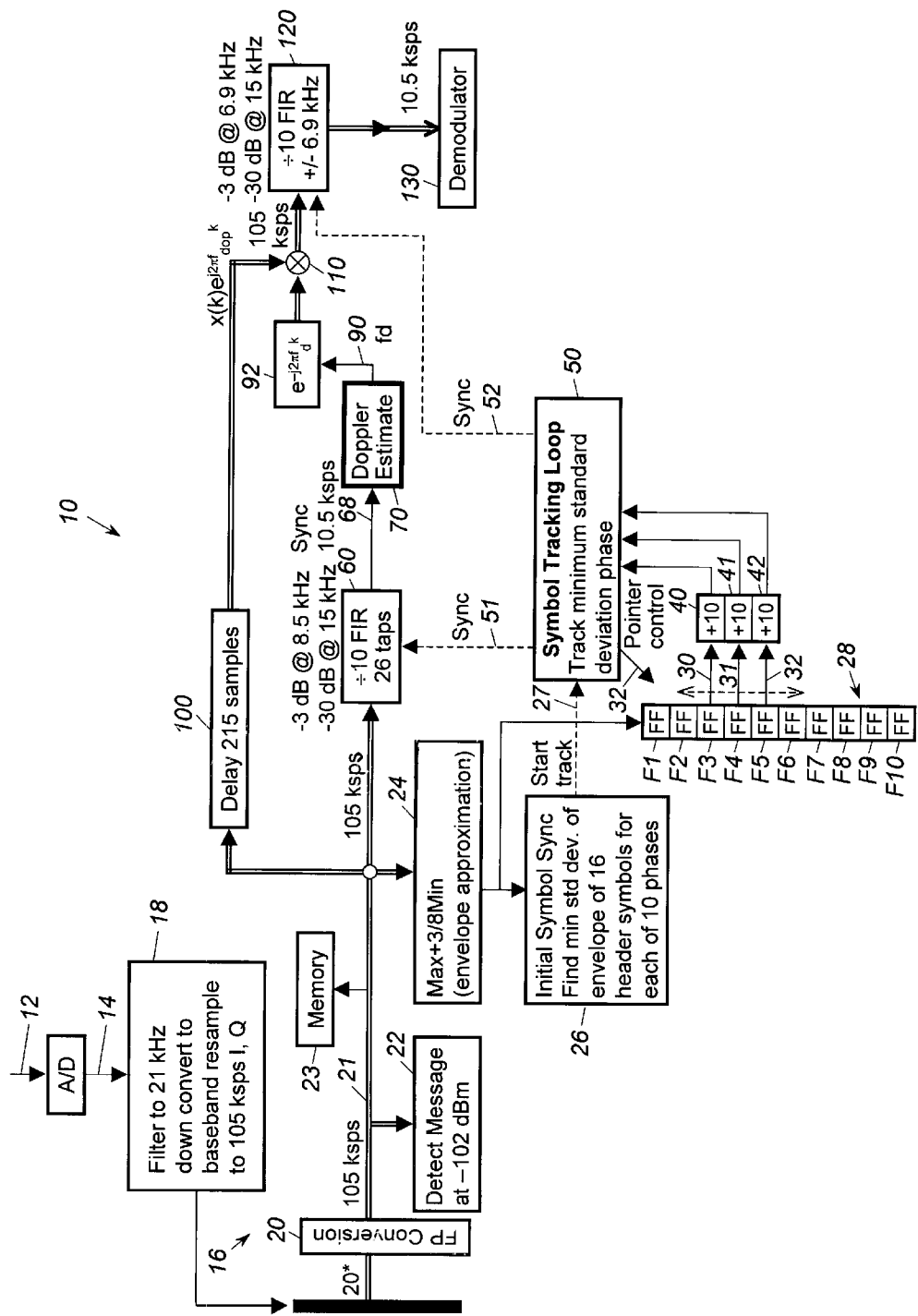
FIG. 1 is a schematic and functional block diagram of a preferred form of radio receiver embodying the invention.

Referring to FIG. 1, a preferred form of radio receiver 10 is adapted to receive a carrier signal having a Doppler shifted frequency and carrying a coded signal having a variable amplitude and phase. The coded signal represents symbols coded by phase which are divided into a preamble portion having a predetermined code and a message portion in which the coding varies in order to transmit information. Coding is in the form of D8PSK phase shift keying modulation. The coding is received at a symbol rate of 10.5K symbols per second.

The carrier signals are received by a conventional antenna (not shown), and are down converted to an intermediate frequency (IF) carrier which still carries the coded signal representing the D8PSK coding. The IF carrier is received at an input 12 and is converted to digital form via a conventional analog to digital converter 14 operating at 50 MSPS (megasamples per second). The converted digital IF signal is received by a logic unit 16 which may be in the form of a digital signal processor that performs various operations described in the remaining blocks shown in FIG. 1. For example, in block 18, the processor filters the digital 50 MSPS IF signal to + or −21K Hz, down converts the IF digital signal to baseband frequency and resamples the baseband frequency to generate orthogonal I and Q signals at a rate of 105 KSPS. The processor also may perform data output buffering in operation 18.

The signal generated by operation 18 is converted in operation 20 to a floating point signal still having a rate of 105 KSPS. For each sample received, the floating point conversion operation converts 13 bits of signed integer value and 3 bits of decimal position to create a virtual 20 bit signal which is then converted to a floating point format.

The output of the floating point conversion operation is received along a signal path 21 by a message detect operation 22. Operation 22 declares that a message has been detected when the received power referenced to the antenna input port exceeds −102 dBm. Message operation 22 is used to detect only the preamble portion of the coded signal.

After the preamble portion of coded signal is detected in operation 22, the next 180 samples of the coded signal are stored in memory 23 for use in initializing symbol synchronization and Doppler acquisition. The sampling resulting in the 180 samples is carried out at 105 KSPS which is 10 times the symbol rate of 10.5 KSPS. As a result, there are 10 samples for every symbol stored in 23. There are 18 symbols total in the preamble portion of the coded signal. As a result, 10 samples are stored for each of the symbols in the preamble.

In operation 24, the envelope of the samples stored in memory 23 are approximated. In operation 24, the phase information in the 180 stored samples is ignored and the amplitude information is at least approximated.

In operation 26, the amplitude information from the 180 samples received from operation 24 is used to divide the samples into 10 groups, 1 for each of the 10 possible sample phases. The groups consist of 1 sample from each of the 18 symbols, forming ten different decimate by 10 groups. For example, the first sample from each of the 18 symbols forms a first group and the second sample from each of the 18 symbols forms a second group, etc. The groups are compared to determine the one with minimum variation of envelope amplitude. Preferably, the minimum variation is determined by estimating the minimum standard deviation among the groups. Each of the ten samples for each of the symbols stored in memory 23 is fed in time sequential fashion to a shift register 28 comprising flip flops F1–F10. The flip flop holding the sample from the group having the minimum variation is conducted over a path 31 and the two adjacent samples are transmitted over paths 30 and 32. The relationship of paths 30–32 to flip flops F1–F10 varies depending on which group of samples is estimated to have the minimum variation of amplitude.

Shift register 28 may be in the form of a continuous loop so that the information transmitted to path 31 may jump from flip flop F10 to flip flop F1 (and vice versa) depending on the sample group determined to have the minimum variation of amplitude. The transmission of signals from flip flops F1–F10 to paths 30–32 is controlled in a well known manner by a symbol tracking loop 50 which receives the identification of the group having the minimum variation of amplitude from operation 26 over a path 27.

The signals on paths 30–32 are transmitted to decimators 40–42, respectively. Loop 50 interpolates between the information from decimators 40–42 in order to generate a signal on a path 51 indicating which of the sample groups in memory 23 most accurately tracks the symbols coded into the coded signal received on path 21. The signal on path 51 also is sent over another path 52.

Symbol tracking loop 50 tracks symbol drift due to the changing link delay due to aircraft motion. Correct sample timing can be maintained to an accuracy of less than 9.5 microseconds with a symbol drift rate of 4.28 samples/second (1 sample phase/2454 symbols). The symbol tracking loop is capable of tracking a constant symbol drift rate of 1+/−10 symbols/second.

The samples stored in memory 23 are filtered in a divide by ten finite impulse response filter 60 which has a −3 decibel attenuation at 8.5 KHz and a −30 decibel attenuation at 15 KHz.

As previously described, the information on path 51 indicates to filter 60 the group of samples stored in memory 23 which are selected and passed onto path 68. The group determined by operations 26 and 50 to have the minimum variation of amplitude is the group selected by filter 60 for transmission on path 68 to a Doppler estimator 70.

Figure 2:
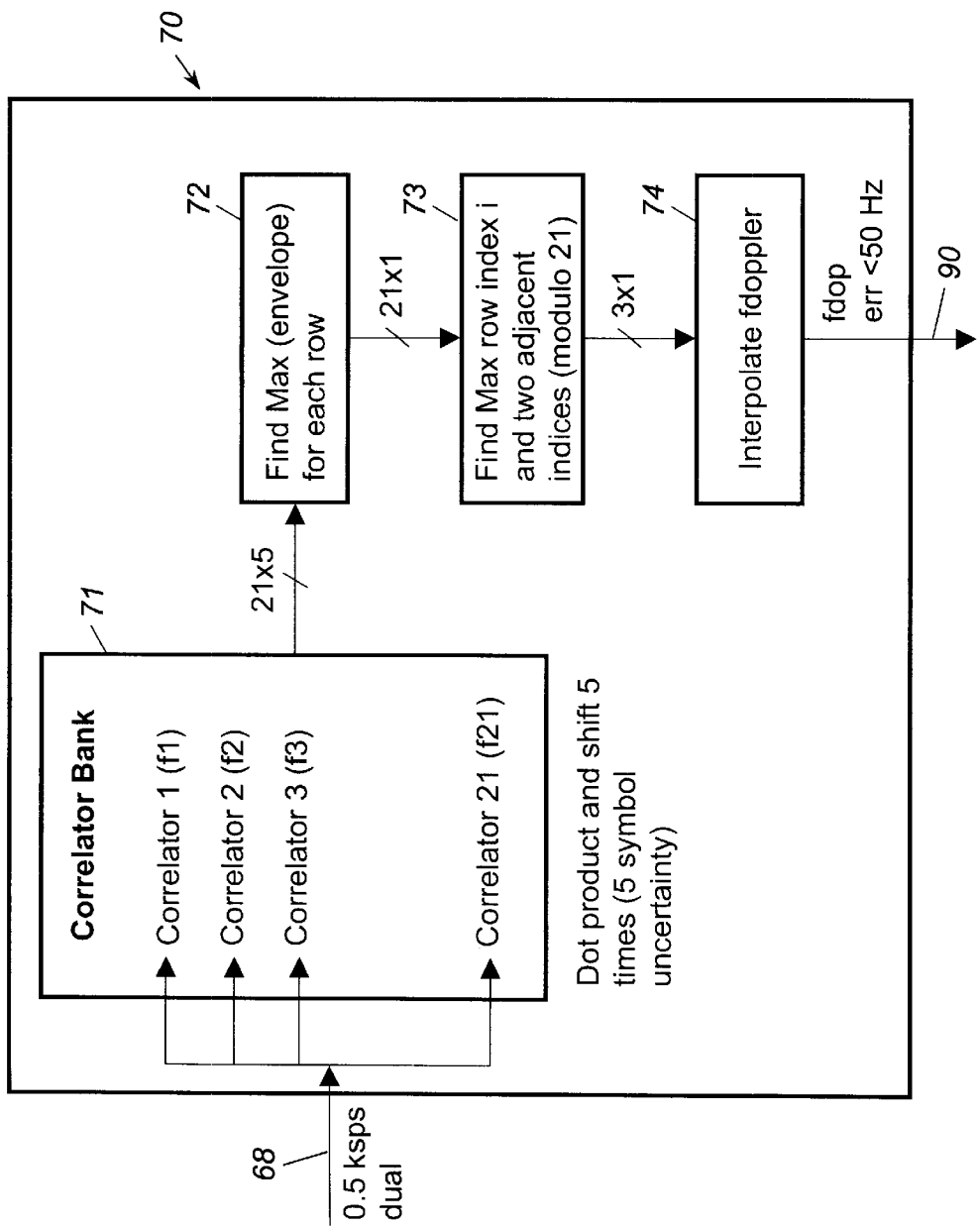
FIG. 2 is a functional diagram of a preferred form of the Doppler estimate referred to in FIG. 1.

Referring to FIG. 2, Doppler estimator 70 includes a correlation bank 71 which may form part of memory 23. Correlator bank 71 stores 21 frequency shifted versions of the code for the transmitted complex preamble of the Mode 2 message received on path 21 as correlation reference signals. Each of the stored correlation reference signals is identical except for a frequency shift. The stored correlation signals are compared with the samples received on path 68, and the stored correlation signal corresponding most closely to the samples received on path 68 is identified in operation 72.

In operation 73, the maximum row index I and two adjacent indices are identified. In other words, the stored correlation signal having maximum correlation and the two adjacent correlation signals having frequencies closest to the maximum correlation signal are identified in operation 73. The values of a Doppler frequency identified in operation 73 are used as the basis for interpolation in operation 74. Preferably, the interpolation is carried out by an inverse hyperbolic tangent function as shown in FIG. 3.

Using the 180 sample buffer data in memory 23, the Doppler present on the received D8PSK signal can be estimated by operation 70 to an accuracy of better than +/−50 Hz. With inverse hyperbolic interpolation, an accuracy better than 10 Hz can be achieved. The algorithm of operation 70 performs 21 correlations of the dual decimated input with Doppler shifted versions of the first 16 message symbols (a fixed reference). The time uncertainty due to detection is assumed to be 5 symbols, so only 5 complex dot products need be performed per correlation. The number of multiplies for Doppler estimation =21×16×4×5=6720. The magnitudes of each correlation are compared, and the largest and two adjacent magnitudes are captured. These data are interpolated to find the estimated Doppler. At the end of this process, the synch phase is completed.

More specifically, operation 70 performs complex correlation of a received complex signal of unknown arrival time and phase but known preamble modulation against a bank of N (e.g., N=21) frequency shifted versions of the complex. preamble. This produces a set of correlator outputs from which threshold comparison yields symbol sync. If processing intensity was not limited, this type of process could be used for detection, as well. Here it can be used for a false alarm suppression by verifying that the detected message has a large peak-sidelobe correlation output. The maximum value and two adjacent frequency bin readings yields three correlator values, P_, Po, P+. A unique interpolation linearizing algorithm is used here which passes the linear estimate (P+−P−)/Po through a hyperbolic tangent function producing a near linear frequency interpolation over the range of the cell having the highest correlation. The message detection is very robust since it integrates energy over 16 symbols and due to the complex reference, also will fight narrowband interference (BW<8 kHz) since some anti-jam processing gain is achieved in this correlator.

Figure 3:
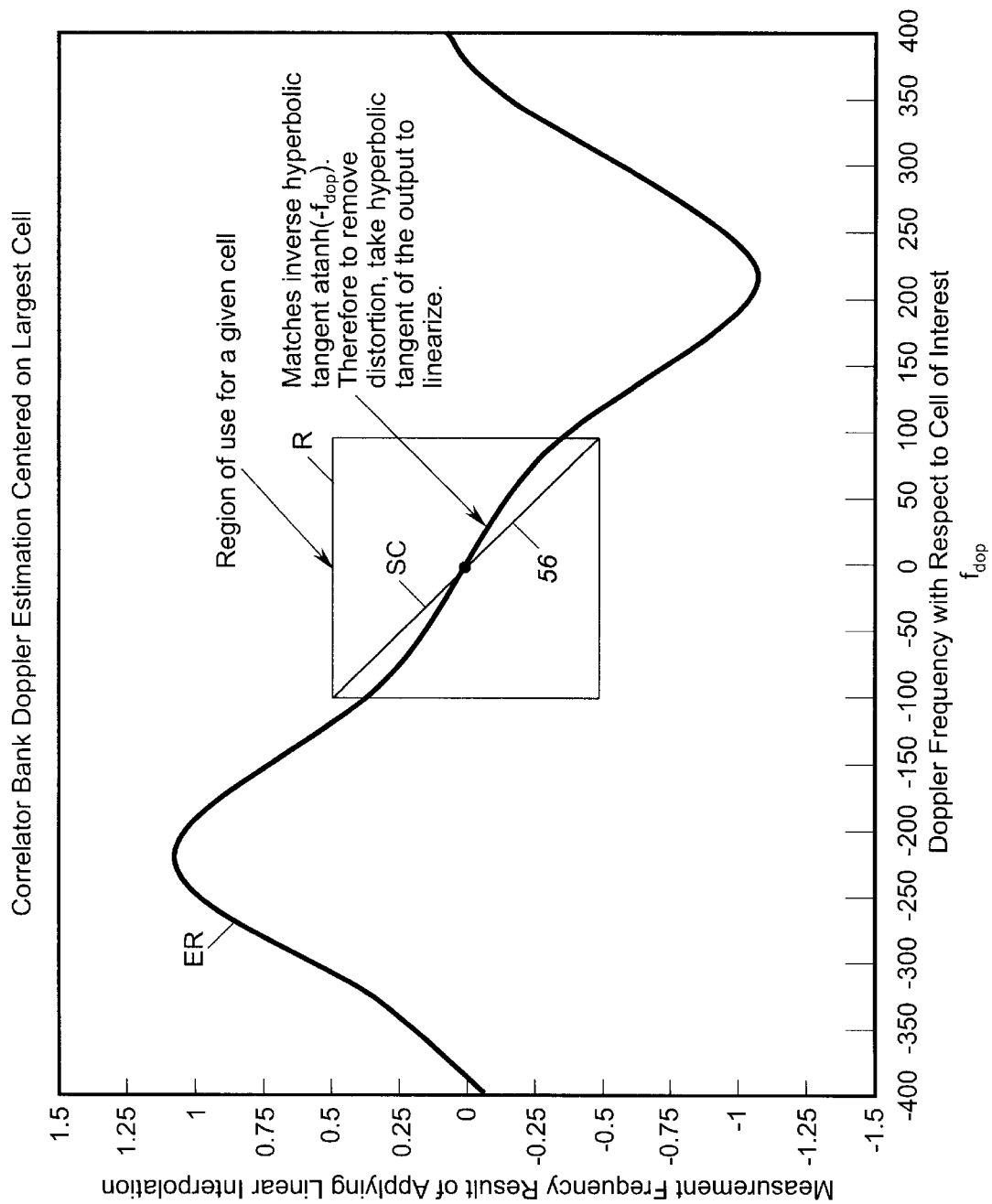
FIG. 3 is a graph illustrating a preferred form of interpolation used in connection with the Doppler estimate illustrated in FIG. 2.

FIG. 3 illustrates the error in frequency using linear interpolation. The straight line 56 represents a desired linear Doppler estimate in the region of a cell. The portion of the error waveform in region R closely matches an inverse hyperbolic tangent. To remove the distortion, operation 74 takes the hyperbolic tangent of the output of operation 73 to linearize the output essentially along line SC.

Referring again to FIG. 1, operation 70 results in an estimation of the Doppler frequency by which the received carrier frequency is shifted. The estimated Doppler frequency shift is represented by the value of a signal transmitted along a path 90 to a trigonometric function 92 which multiplies the value on path 90 by both a sine and cosine to generate a signal having orthogonal I and Q components.

While the processing described in connection with operations 24, 26, 50, 60, and 70 and 92 are being carried out, samples of the coded signal received on path 21 are being delayed in a delay operation 100. Operation 100 delays the signals received on path 21 by 215 samples. The delayed samples from operations 100 are multiplied with the output of operation 92 in a multiply operation 110 which proceeds at 105 KSPS.

The product of multiplication function 110 is processed by a decimate by ten finite impulse response filter 120 having a band pass less than one half of the channel separation defined by the input carrier signal. According to recent FAA regulations, a channel separation of 25 KHz is required, and the regulated power must be reduced to near zero within a 12.5 KHz of the center transmitter frequency. The band pass of filter 120 is set at 6.9 KHz which is less than half of the 25 KHz separation required between channels. The decimating carried out by operation 120 reduces the sample rate to 10.5 KSPS which is the same as the symbol rate.

The signal resulting from filtering operation 120 is then processed by a conventional demodulator 130. The demodulator processing is facilitated by the reduction of the sampling rate to the symbol rate by filter operation 120.

Those skilled in the art will recognize that the preferred embodiment may be modified without departing from the true spirit and scope of the invention as defined in the accompanying claims. For example, logic unit 16 may comprise various forms of digital signal processors or microprocessors. The number of correlator filters may be increased from 21, resulting in improved Doppler estimates, or decreased below 21, resulting in decreased Doppler estimation accuracy. The use of the hyperbolic tangent interpolator linearizer allows the number of filters to be reduced to 11, at least. In addition, unit 16 may comprise various application specific integrated circuits capable of carrying out arithmetic and logic operations. The foregoing processors and circuits are hereafter collectively referred to as logic units.

What is claimed is:

1. In a radio receiver adapted to receive a carrier signal having a Doppler shifted frequency and carrying a coded signal having a variable amplitude, said coded signal representing symbols coded by phase, said symbols being divided into a preamble portion defining a predetermined code and a message portion and being generated at a predetermined symbol rate, apparatus for processing said coded signal comprising:

a memory connected to store samples of said coded signal representing at least some of said predetermined symbols of said preamble, said stored samples having variable amplitudes; and a logic unit dividing said stored samples into a plurality of sample groups, identifying one sample group of said sample groups having a predetermined amplitude relationship with respect to other of said sample groups, selecting samples of said coded signal in response to said identification of said one sample group, estimating the Doppler frequency of said selected samples, delaying the message portion of said coded signal, reducing the Doppler frequency of said coded signal in response to the estimating of the Doppler frequency to generate a Doppler reduced coded signal, filtering the Doppler reduced coded signal, and demodulating said message portion in response to said Doppler reduced coded signal to facilitate recovery of the message portion of said coded signal.

2. Apparatus, as claimed in claim 1, wherein said predetermined amplitude relationship comprises a value representing a minimum variation of the amplitude of said sample groups.

3. Apparatus, as claimed in claim 2, wherein said minimum variation comprises a minimum standard deviation.

4. Apparatus, as claimed in claim 1, wherein said memory further stores a plurality of signals representing a plurality of frequency shifted versions of said preamble and wherein said logic unit estimates the Doppler frequency by correlating said stored signals representing said preamble with said selected samples.

5. Apparatus, as claimed in claim 4, wherein said logic unit performs said correlating by selecting a plurality of said stored signals which most nearly correlate with said stored signals and wherein said logic unit estimates the Doppler frequency by interpolating between the values of said selected stored signals.

6. Apparatus, as claimed in claim 1, wherein said carrier signal defines a channel separation frequency range and wherein said logic unit performs said filtering by filtering with a pass band less than one half said channel separation.

7. Apparatus, as claimed in claim 1, wherein said logic unit samples said coded signal at a multiple of said symbol rate to generate said stored samples and wherein said logic unit divides said reduced coded signal by said multiple, whereby said demodulating is aided.

8. Apparatus, as claimed in claim 1, wherein the logic unit comprises a digital signal processor.

9. In a radio receiver adapted to receive a carrier signal having a Doppler shifted frequency and carrying a coded signal having a variable amplitude, said coded signal representing symbols coded by phase, said symbols being divided into a preamble portion defining a predetermined code and a message portion and being generated at a predetermined symbol rate, a method of processing said coded signal comprising:

storing samples of said coded signal representing at least some of said predetermined symbols of said preamble, said stored samples having variable amplitudes;

dividing said stored samples into a plurality of sample groups;

identifying one sample group of said sample groups having a predetermined amplitude relationship with respect to other of said sample groups;

selecting samples of said coded signal in response to said identification of said one sample group;

estimating the Doppler frequency of said selected samples;

delaying the message portion of said coded signal;

reducing the Doppler frequency of said coded signal in response to the estimating of the Doppler frequency to generate a Doppler reduced coded signal;

filtering the Doppler reduced coded signal; and demodulating said message portion in response to said Doppler reduced coded signal to facilitate recovery of the message portion of said coded signal.

10. A method, as claimed in claim 9, wherein said identifying comprises identifying one sample group of said sample groups having a value representing a minimum variation of the amplitude of said sample groups.

11. A method, as claimed in claim 10, wherein said identifying comprises identifying one sample group of said sample groups having a minimum standard deviation.

12. A method, as claimed in claim 9, wherein said storing comprises storing a plurality of signals representing a plurality of frequency shifted versions of said preamble and wherein said estimating comprises estimating the Doppler frequency by correlating said stored signals representing said preamble with said selected samples.

13. A method, as claimed in claim 12, wherein said correlating comprises selecting a plurality of said stored signals which most nearly correlate with said stored signals and wherein said estimating comprises estimating the Doppler frequency by interpolating between the values of said selected stored signals.

14. A method, as claimed in claim 9, and further comprising:

sampling said coded signal at a multiple of said symbol rate to generate said stored samples; and dividing said reduced coded signal by said multiple, whereby said demodulating is aided.

* * * * *